Figure 1:
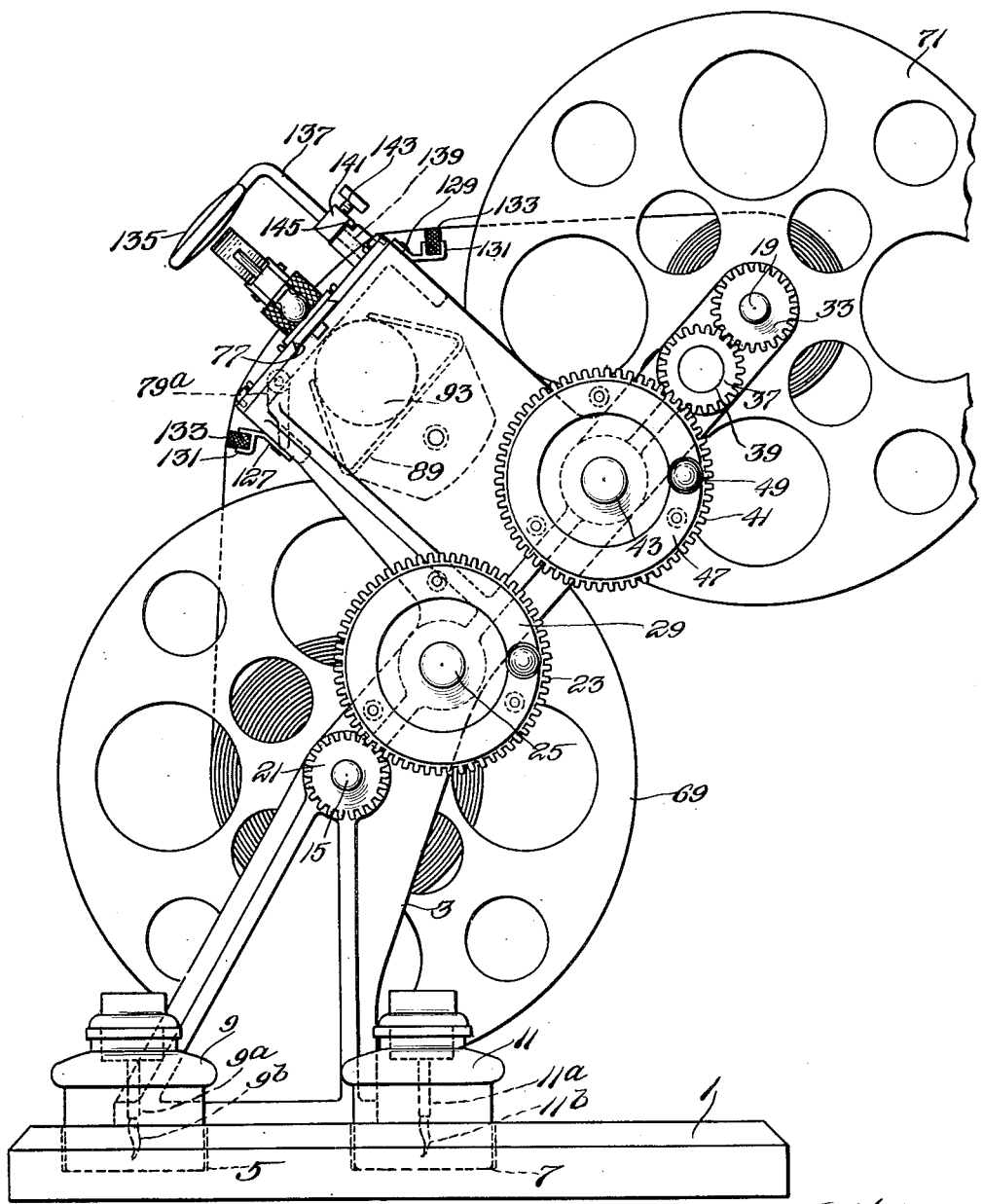

July 4, 1933.  A. C. HAYDEN  1,916,311
MACHINE FOR INSPECTING, SPLICING, AND REWINDING MOTION PICTURE FILMS
Filed Oct. 19, 1927   2 Sheets-Sheet 1

Inventor:
Arthur C. Hayden
by Henry T. Williams, atty

July 4, 1933.   A. C. HAYDEN   1,916,311
MACHINE FOR INSPECTING, SPLICING, AND REWINDING MOTION PICTURE FILMS
Filed Oct. 19, 1927   2 Sheets-Sheet 2
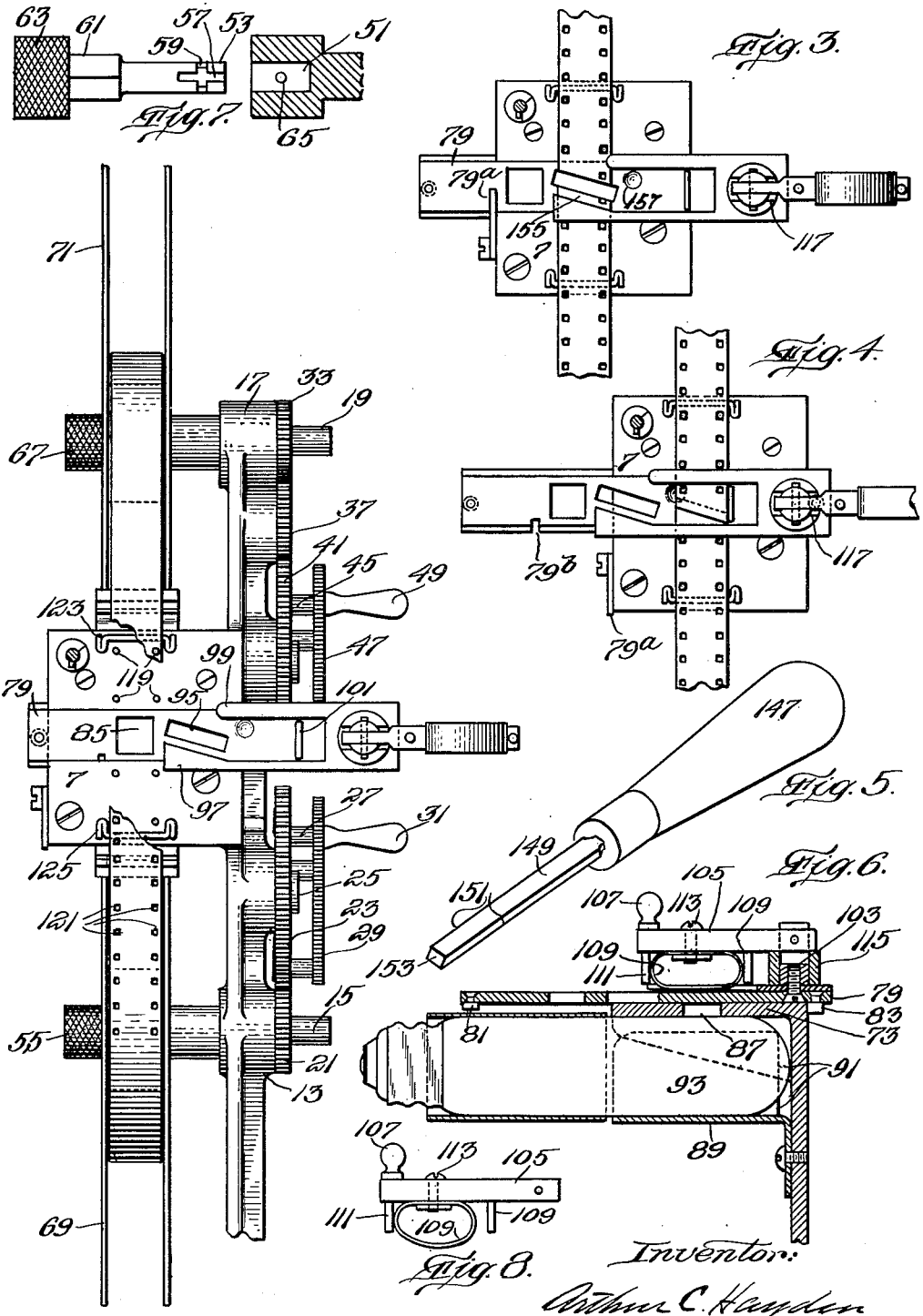
Inventor:
Arthur C. Hayden
by Henry T. Williams
Atty.

Patented July 4, 1933

1,916,311

UNITED STATES PATENT OFFICE

ARTHUR C. HAYDEN, OF BROCKTON, MASSACHUSETTS

MACHINE FOR INSPECTING, SPLICING, AND REWINDING MOTION PICTURE FILMS

Application filed October 19, 1927. Serial No. 227,074.

The invention to be hereinafter described relates to a machine for use in inspecting, splicing and rewinding motion picture films.

One of the purposes of the invention is to provide a simple and efficient machine in which the film reels may be quickly and easily mounted on the machine and removed therefrom. The reels when in the camera or projector are so positioned that the frames or pictures on the film back of the lens are bottom side up. The present machine has provision for mounting the reels thereon so that they will be reversed side-for-side thereby to enable the pictures to be inspected right side up.

Another purpose of the invention is to provide means for feeding the film slowly from either reel to the other for purposes of inspection, and for feeding the film rapidly in rewinding the same.

Another purpose of the invention is to provide convenient and efficient means for cutting out imperfect portions of the film and quickly and accurately splicing ends of the film together. Still another purpose of the invention is to provide the machine with a table between the reels over which the film passes. This table has an aperture therein over an electric lamp beneath the table for illuminating the film. A magnifying glass is mounted on the table and is movable to and from a position over the film, and is adjustable toward and from the film as required by the observer.

With the aforesaid and other purposes in view, the character of the invention may be best understood by reference to the following description of one good form thereof shown in the accompanying drawings, wherein:—

Fig. 1 is a side elevation of the machine;
Fig. 2 is a plan thereof;
Fig. 3 is a plan of the table and the slide, the latter being in position for severing or cutting out a portion of the film;
Fig. 4 is a view similar to Fig. 3 showing the slide in position for splicing the film;
Fig. 5 is a perspective view of the cutting tool;
Fig. 6 is a transverse section through the table and slide showing the film presser in active position;
Fig. 7 is a view of the spindle and pin connections; and
Fig. 8 is a view of the film presser showing the shape of the spring when in inactive position.

Referring to the drawings, the machine shown therein as one embodiment of the invention comprises a suitable support, in the present instance including a base 1 (Fig. 1) having an inclined standard 3 mounted thereon, said base being provided with recesses 5 and 7 for receiving a water containing bottle 9 and a cement containing bottle 11. The bottle 9 has a stopper provided with a stem 9a having a brush 9b, and the bottle 11 has a stopper provided with a stem 11a having a brush 11b.

The standard is formed to provide a bearing 13 in which a lower reel spindle 15 is journalled and a bearing 17 in which an upper reel spindle 19 is journalled. The spindle 15 has a gear 21 fast thereon meshing with a larger gear 23 mounted on a stud shaft 25 on the standard. Projecting from the gear 23 are studs 27 carrying a ring 29 having a knurled periphery, said ring being provided with a crank handle 31.

Fast on the spindle 19 is a gear 33 meshing with an intermediate gear 37 mounted on a stud shaft 39 on the standard. The gear 37 meshes with a larger gear 41 mounted on a stud shaft 43 on the standard. Projecting from the gear 41 are studs 45 carrying a ring 47 having a knurled periphery, said ring being provided with a crank handle 49.

The construction is such that the operator may grasp the rings when it is desired to rotate the reels slowly and one or the other of the handles when it is desired to rotate the reels rapidly. The arrangement of the gears is such that both rings and handles are rotated in the same direction to rotate the spindles in opposite directions.

To support the reels on the spindles in positions reverse to those of the reels in the camera or projector, special pins are provided. The spindle 15 has a socket 51 adapted to receive an end portion 53 of a pin 55, said portion having a longitudinal slot 57 and a transverse slot 59 crossing the same. The pin has a square portion 61 and a knurled end 63. The circular and square portions of the pin are adapted to project through circular and square holes in the side plates of the usual film reel. The socket 51 has a short pin 65 adapted to enter the longitudinal slot 57 and then enter one or the other of the ends of the transverse slot 59, depending on the direction of rotative adjustment of the pin. The construction is such that a double bayonet joint is provided for connecting the pin to the spindle. The provision of the two ends of the transverse slot is desirable since the pin will remain in one or the other end and prevent accidental escape of the pin and reel from the spindle when its direction of rotation is reversed. The spindle 19 is provided with a pin 67 the same as the pin 55 described.

A reel 69 may be mounted on the pin 55 and a reel 71 may be mounted on the pin 67, said reels being of the usual construction used in motion picture cameras and projectors. The pins enable the reels to be quickly mounted on and removed from the spindles and support the reels so that the frames on the film extending between the reels may be viewed right side up by the observer facing the machine.

The film may be fed from reel to reel over a table 73 mounted on and projecting laterally from the standard, said table being inclined to enable easy inspection of the film. On this table and secured by screws is a plate 75 provided with a dovetail groove 77 receiving a slide 79 which is movable transversely across the plate and is limited by stops 81 and 83 at the under face of the slide and adapted to engage edges of the table.

The slide has an aperture 85 therein adapted to register with an aperture 87 in the table. Beneath the table is a bracket 89 having a pair of cheeks 91 of resilient material with inner nickle plated or other reflector surfaces. The construction is such that a tubular electric lamp bulb 93 may be pressed in between and be gripped by the the cheeks thereby securely to hold the same. This lamp will serve to illuminate the portion of the film above the aperture 85 and the brilliance of the light will be increased by the reflector cheeks.

The slide has an oblong slot 95 oblique to the length of the slide, and adjacent to the slot is a leaf spring presser 97 having a resilience tending to cause said spring to stand slightly up from the slide. This presser is wedge-shaped and has an edge parallel to the slot. Extending along and spaced slightly from the slide is a finger 99, and extending transversely thereto is a ridge 101 serving as a guide for engagement with edges of the film ends to be spliced as more fully hereinafter described.

To hold the spliced ends of the film together while the cement between them sets, a holder or presser is provided comprising a post 103 at one end of the slide having an arm 105 pivotally mounted thereon. A handle 107 rises from the arm and projecting down from the arm are a pair of pins 109. A loop or elliptical spring 111 depends from the arm and is secured thereto by a screw 113. The arm is movable to and from its operative position (Figs. 4 and 6) and is held in said position by a lock ring 115 on the post 103 which has a notch 117 therein adapted to receive the heel of the arm when the latter is brought to its inoperative position. When the arm has been brought to its operative position it may be held by giving the ring a slight rotative adjustment which will cause an upper portion thereof to come beneath the heel of the arm.

The plate 75, referred to, has rows of teeth 119 (Figs. 2, 3 and 4) adapted to enter the rows of feed holes 121 adjacent the edges of the film. Mounted on the plate adjacent the upper and lower edges thereof are guides 123 and 125 conveniently formed of wire and having legs inserted in holes in the plate.

To clean the under surface of the film a pair of brackets 127 and 129 may be secured to the upper and lower edges of the table. Each of these brackets is provided with a trough 131 adapted to hold a wick 133 which may be saturated with a suitable preparation for cleaning the under surface of the film as it rubs over said wick.

A magnifying glass 135, Fig. 1, is carried by an arm 137 having an end adapted to set in a socket 139 on the plate. A sleeve 141 is adjustably secured on the arm by a set screw 143, said sleeve being provided with a pin 145 adapted to engage opposite ends of a shoulder 146 at the top of the socket. The magnifying glass may be swung to operative and inoperative positions determined by engagement of the pin with the ends of the shoulder. The sleeve may be adjusted along the arm to vary the distance of the magnifying glass from the plate to meet the needs of the observer.

A tool 147 (Fig. 5) is provided and has a blade 149 with opposed beveled edges 151 and a beveled end 153. The width of the blade is such that it will fit into the slot 95, referred to, in the plate.

In use, the pins 55 and 67 are inserted through the reels and connected to the spindles. Assuming the reel 71 is loaded with film, the free end of the latter may be carried over the table and attached to the hub of the lower reel. Then the ring 29 or the handle 31 may be grasped and rotated in a clockwise direction, thereby to wind the film on the lower reel.

If it be desired to inspect or edit the film the slide is adjusted on the table to the right (Fig. 2) thereby exposing the aperture 85. The magnifying glass is swung to its operative position in which it is above said aperture and the electric lamp bulb is inserted between the cheeks of its carrying bracket. Then the ring 29 is grasped and slowly turned to cause the film to traverse the table across the aperture 85. The successive frames or pictures will be brightly illuminated by the light and will appear enlarged to the observer looking through the magnifying glass, so that ready and careful inspection of the film may be made. As the film crosses the table it will be held by the guides 123 and 125 up above the plate sufficiently to clear the rows of teeth 119.

On discovery of an imperfect frame or frames the portion of the film containing the same may be cut out. To accomplish this the film is pressed down slightly toward the plate so that the teeth 119 will enter feed holes of the film. Then the slide is adjusted to the left to its position shown in Fig. 3 and is held by adjustment of a dog 79a into an edge notch 79b in the slide. Now the leaf spring presser 97 will overlie the film and the end of the finger 99 will overlie an edge of the film as will be observed in Fig. 3.

The film is now in readiness to be severed. To accomplish this the leaf spring 97 is pressed down toward the plate to hold the film and then the blade of the tool 147 is presented to the film and pressed down into the slot 95. In so doing its edges 151 will cooperate with the slot to die out an elongated piece from the film. By having the slot disposed obliquely to the length of the slide, a splice of greater length can be made than if the slot were parallel to the length of the slide.

Next the stopper of the water bottle is removed and its brush is swept across and moistens the margin 155 of the film standing beyond the upper edge of the leaf spring 97. Then the tool is passed across the film margin and against the upper edge of the leaf spring to score the film. Next the end of the blade is applied to the film margin to scrape the emulsion therefrom in order that the margin may be clean and adhere to the cement. The leaf spring is pressed down against the film in scoring and scraping the same.

After scraping the margin of the film the other end of the film is lifted from the teeth 119 holding the same and the film is brought down and re-applied to the teeth so that the ends of the film will overlap. In so adjusting the upper end of the film, an edge thereof is slipped beneath the end of the finger 99.

Next the dog is rocked out of the edge notch of the slide and the latter is moved to the left to its position shown in Fig. 4, and the ridge 101 will engage and aline edges of the overlapped ends of the film. The end of the blade of the tool is inserted in a depression 157 in the slide and the upper end portion of the film beyond the finger 99 is pried up so as to expose the film margin 155. The stopper of the cement bottle is lifted from the bottle and its brush is swept across the film margin thereby to apply the cement thereto. Then the blade of the tool is removed from the depression to allow the upper end of the film to come down on the cement coated film margin.

Next the arm 105 is rocked to bring the elliptical spring down onto the overlapped ends of the film and the arm is secured by adjustment of the sleeve 115 to a position beneath the heel of the arm. When the spring is pressed down it will elongate the spring and cause the ends thereof to engage the pins 109, thereby to increase the pressure. The spring is allowed to stand in its operative position for about one minute in order the hold the film ends together until the cement has set. Then the arm may be adjusted to its inoperative position. When the arm is rocked upward the spring will assume its normal position in which it takes an elliptical form (Fig. 8) of less length than when in its operative position. The construction is such that on moving the spring away from the film it will leave edge portions of the film before leaving the center of the film. This is a desirable feature since it tends to prevent the spring from pulling the film up at the edges and breaking the splice.

The film having been spliced, the slide may be adjusted to the right to its inoperative position, and feeding of the film and inspection thereof may be resumed. It will be understood that if a portion of the film greater than the width of the blade is to be removed it will be necessary to make two cuts across the film and then the ends may be brought together and spliced as described above.

After the film has been inspected, it may be quickly rewound back onto the reel from which it was fed, and this may be accomplished while the reels remain on the spindles, since either spindle may be used as the driving spindle.

It will be understood that the invention is not limited to the specific embodiment shown, and that various deviations may be made therefrom without departing from the spirit and scope of the appended claims.

What is claimed is:

1. A machine of the character described comprising, in combination, a support, a table on the support having an aperture therein and over which film may be fed, means adapted to support an electric lamp beneath the aperture, and a slide having a slot therein adapted to cooperate with a tool for severing the film, said slide being movable on the table to adjust the slot to and from a position beneath the film.

2. A machine of the character described comprising, in combination, a support, a table on the support and over which film may be fed, a slide on the table having a slot therein adapted to cooperate with a tool in severing the film, and a member on the slide adjacent to the slot for holding the film while severing the same.

3. A machine of the character described comprising, in combination, a support, a table on the support and over which film may be fed, and a slide on the table having a slot therein adapted to cooperate with a tool in severing the film, said slide having fingers for holding the film onto the table.

4. A machine of the character described comprising, in combination, a support, a table on the support and over which film may be fed, said table having teeth for entrance into feed holes of the film, and a slide on the table having provision for holding the film onto said teeth.

5. A machine of the character described comprising, in combination, a support, a table on the support and over which film may be fed, a slide on the table having a slot adapted to receive a tool for severing the film, and a film edge guide on the slide, the latter being adjustable to move the slot beneath the film and to bring the guide into engagement with the edge of the film.

6. A machine of the character described comprising, in combination, a support, a table on the support and over which film may be fed, a slide on the table having a slot therein adapted to cooperate with a tool in severing the film, and a spring presser on the slide for holding overlapping ends of the film together.

7. A machine of the character described comprising, in combination, a support, a table on the support and over which film may be fed, a slide on the table having a slot therein adapted to cooperate with a tool in severing the film, and an arm on the slide having a spring presser for holding overlapped cemented ends of the film together while the cement is setting.

8. A machine of the character described, comprising, in combination, a support, a table on the support and over which film may be fed, a slide on the table having a slot therein adapted to cooperate with a tool in severing the film, and a presser for holding together overlapped cemented ends of the film and having a loop-shaped spring for engagement with the film and adapted on release to leave edges of the film before leaving the center portion of the film.

9. A machine of the character described comprising, in combination, a support, a table on the support and over which film may be fed, a slide on the table having a slot therein adapted to cooperate with a tool in severing the film, a presser for holding together overlapped cemented ends of the film and having a loop-shaped spring for engagement with the film, said presser being movable to and from film engaging position, and means to lock the presser in said position.

10. A machine of the character described comprising, in combination, a support, a table on the support and over which film may be fed, and a slide on the table having a slot therein for cooperation with a tool in severing the film, said slide being movable to bring the slot beneath the film and movable to a position for holding ends of the film after severing the film.

11. A machine of the character described, comprising in combination a support, a table on the support having an aperture therein, means adapted to support an electric lamp beneath the aperture, means for feeding film over the aperture where it may be inspected, and means for supporting the film for repair purposes adjacent to its inspection location, said last-named means being shiftable from said film supporting position.

ARTHUR C. HAYDEN.